(12) United States Patent
Mei et al.

(10) Patent No.: US 12,711,525 B2
(45) **Date of Patent: *Aug. 18, 2026**

(54) CROSS-CHANNEL PERSONALIZED MARKETING OPTIMIZATION

(71) Applicant: Airbnb, Inc., San Francisco, CA (US)

(72) Inventors: Shike Mei, San Francisco, CA (US); Teng Wang, San Francisco, CA (US); Xi Chen, San Francisco, CA (US); Ganesh Venkataraman, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,874

(22) Filed: Aug. 1, 2024

(65) Prior Publication Data

US 2024/0394749 A1 Nov. 28, 2024

Related U.S. Application Data

(63) Continuation of application No. 17/657,869, filed on Apr. 4, 2022, now Pat. No. 12,086,835, which is a (Continued)

(51) Int. Cl.

| | |
|---|---|
| ***G06Q 30/0251*** | (2023.01) |
| ***G06Q 30/0241*** | (2023.01) |
| ***G06Q 30/0242*** | (2023.01) |

(52) U.S. Cl.

CPC ..... *G06Q 30/0271* (2013.01); *G06Q 30/0246* (2013.01); *G06Q 30/0249* (2013.01); *G06Q 30/0276* (2013.01)

(58) Field of Classification Search

None

See application file for complete search history.

(56) References Cited

U.S. PATENT DOCUMENTS

| | | | |
|---|---|---|---|
| 10,078,854 | B1 | 9/2018 | Minks-Brown |
| 10,402,853 | B1 | 9/2019 | Tsemekhman et al. |

(Continued)

FOREIGN PATENT DOCUMENTS

| | | | |
|---|---|---|---|
| WO | 2007103646 | A2 | 9/2007 |
| WO | 2008070834 | A2 | 6/2008 |
| WO | 2018178600 | A2 | 10/2018 |

OTHER PUBLICATIONS

Spread, Then Target, and Advertise in Waves: Optimal Budget Allocation Across Advertising Channels; Eshghi et al., arXiv: 1702.03432v2 [math.QC] Jul. 24, 2018.

*Primary Examiner* — David J Stoltenberg

(74) *Attorney, Agent, or Firm* — McDermott Will & Schulte LLP

(57) ABSTRACT

A cost-focused determination of whether to deliver an electronic advertisement or notice to a particular user can be made through a cumulative consideration of the predicted return on investment over each of a plurality of electronic channels. A plurality of channel-specific budget values are calculated for the user, one for each channel, each setting an upper spending limit for advertisement to the user over that channel based on the user's information and their activity on the channel. A global budget is calculated for the user using a weighted aggregation of the channel-specific values, information about the user and their activity with the advertiser, and consideration of "overlap" effects of advertising to the same user on several channels. When managing whether to deliver an advertisement over a channel, if the channel-specific value is lower than the global budget, the advertisement is delivered, and the global budget is decreased by a complementary amount.

15 Claims, 6 Drawing Sheets

Related U.S. Application Data continuation of application No. 16/368,691, filed on Mar. 28, 2019, now Pat. No. 11,295,345.

(56) References Cited

U.S. PATENT DOCUMENTS 10,417,658 B1 9/2019 Tsemekhman et al.
10,607,254 B1 3/2020 Sapp et al.
11,049,133 B1 6/2021 Huang et al.
2007/0143186 A1 6/2007 Apple et al.
2008/0270223 A1 10/2008 Collins et al.
2010/0332288 A1 12/2010 Higgins et al.
2011/0071900 A1 3/2011 Kamath et al.
2011/0288907 A1 11/2011 Harvey et al.
2011/0320262 A1* 12/2011 Symons ................ G06Q 30/02 705/14.42
2012/0323674 A1 12/2012 Simmons et al.
2013/0035975 A1 2/2013 Cavander et al.
2013/0325589 A1 12/2013 Jordan
2014/0195334 A1 7/2014 Emans et al.
2014/0297396 A1 10/2014 Feldman et al.
2014/0304069 A1 10/2014 Lacey et al.
2014/0316883 A1 10/2014 Kitts et al.
2015/0186928 A1 7/2015 Chittilappilly et al.
2015/0227963 A1 8/2015 Geyik et al.
2015/0269607 A1 9/2015 Steube et al.
2015/0324865 A1 11/2015 Illowsky et al.
2016/0180373 A1 6/2016 Xu et al.
2016/0210659 A1 7/2016 Chittilappilly et al.
2016/0210661 A1 7/2016 Chittilappilly et al.
2016/0350814 A1 12/2016 Geyik et al.
2017/0061502 A1 3/2017 Zhang et al.
2017/0140418 A1 5/2017 Yadagiri et al.
2017/0213237 A1 7/2017 Yadagiri et al.
2017/0337588 A1 11/2017 Chittilappilly et al.
2018/0053222 A1 2/2018 McClave et al.
2018/0137541 A1 5/2018 Yelton et al.
2018/0192128 A1 7/2018 Manus et al.
2018/0225709 A1* 8/2018 Ferber ................ G06Q 30/0242
2018/0285933 A1 10/2018 Lee-Chan et al.
2018/0308123 A1 10/2018 Zhong et al.
2018/0315077 A1 11/2018 Donnelly
2019/0026775 A1 1/2019 Bhalgat et al.
2019/0034961 A1 1/2019 Gierach
2019/0102807 A1 4/2019 Pham
2019/0114664 A1 4/2019 Goldman et al.
2019/0180315 A1 6/2019 Wood et al.
2019/0340641 A1 11/2019 Yadagiri et al.
2019/0385191 A1 12/2019 Becus et al.
2020/0027121 A1 1/2020 Avedissian et al.
2020/0167819 A1 5/2020 Ramachandran et al.
2020/0219128 A1 7/2020 Ramachandran et al.

* cited by examiner

CROSS-CHANNEL PERSONALIZED MARKETING OPTIMIZATION

This application is a continuation of U.S. patent application Ser. No. 17/657,869 filed Apr. 4, 2022, which is a continuation of U.S. patent application Ser. No. 16/368,691, filed Mar. 28, 2019 (now U.S. Pat. No. 11,295,345 granted Apr. 5, 2022) entitled "CROSS-CHANNEL PERSONALIZED MARKETING OPTIMIZATION", each of which is incorporated herein by reference for all purposes in its entirety.

BACKGROUND

In a digital environment, a merchant (such as an e-commerce provider) may interact with customers or potential customers through any of multiple channels of communication. These channels may include, for example, e-mails, messaging programs, social media, search engines, or applications, among many others. In some instances, these interactions may involve the delivery of advertising or promotional material of a merchant's products/services or other types of notices, to an existing or potential customer. In a circumstance where a merchant has invested in an advertisement, the customer may sometimes respond to the merchant's investment by interacting with the advertisement. A common method of interaction is clicking or selecting a hyperlink displayed in the ad. The outcome of the user's response, such as a purchase made from the advertising merchant or even the simple viewing of the advertiser's website, may be considered as "reward" or "return" for the advertiser's investment. Outside of a purely e-commerce context, a similar investment and reward structure remains in place. For example, marketing or promotional communications may be sent regarding any type of product, service, brand, or issue to persuade a potential target customer/member/user to take an action in response to the communication. Such responsive actions are not limited to making a purchase, but may involve, for instance, registration, following a link to a website, participation in a survey, or sharing or publicizing the content of the communication, among many other potential outcomes. Any of these actions may allow the advertiser to see some amount of return on their investment (ROI).

However, where marketing is conducted to the same customer over multiple electronic channels, each with the goal of triggering a same or similar action from the customer, the use of multiple marketing channels may result in the channels competing with each other. As one example, an advertiser (such as an e-commerce website) may advertise a product or service by sending marketing emails to a potential customer, by purchasing advertisements for display to the same potential customer alongside the customer's relevant search results (e.g., through Google or Facebook Ad services), and by investing in video advertisements delivered to the customer via a video-sharing service. In this example, the advertiser has invested in three separate channels for delivering advertisements to the customer, and each channel of delivery has a non-zero cost associated therewith. The advertiser may, for instance, have to bid on and/or purchase the right to display an ad on a web-based search service, or there may be a computing and resource cost to generate and send an e-mail.

The aggregated costs of investing in multiple channels may create difficulties for the advertiser. Initially, if each marketing channel is separately managed, the cumulative spend on advertisement over different channels may exceed the return the advertiser sees from the customer. Further, in some instances, a customer may have already decided to make a purchase upon receiving a marketing communication on a first channel (e.g., a marketing email), in which case investment into additional channels, such as search and video advertisements, will be wasted expense that does not increase the likelihood or value of the customer's response. In other circumstances, where the customer is uninterested in the marketing communication delivered via a first channel, he may be equally uninterested in the same advertisement presented on other channels, and investment into those other channels would therefore be ineffective. In still other scenarios, the customer may be initially interested, but may be dissuaded from making a purchase due to oversaturation of advertisements delivered via different channels. In any of these circumstances, while a single channel for marketing, used individually, may have a certain predicted return on investment, an advertiser's investment into multiple channels may see less total ROI than the sum total of the predicted ROIs of the individual channels. Further, as the marketing overlap across multiple channels increases, the ratio between the amount invested and the return seen may become starker.

Further techniques for improving decision making regarding whether and when to market over particular electronic channels, and effective management of marketing to reduce diminishing returns on investment, are therefore generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

DETAILED DESCRIPTION

Figure 1:
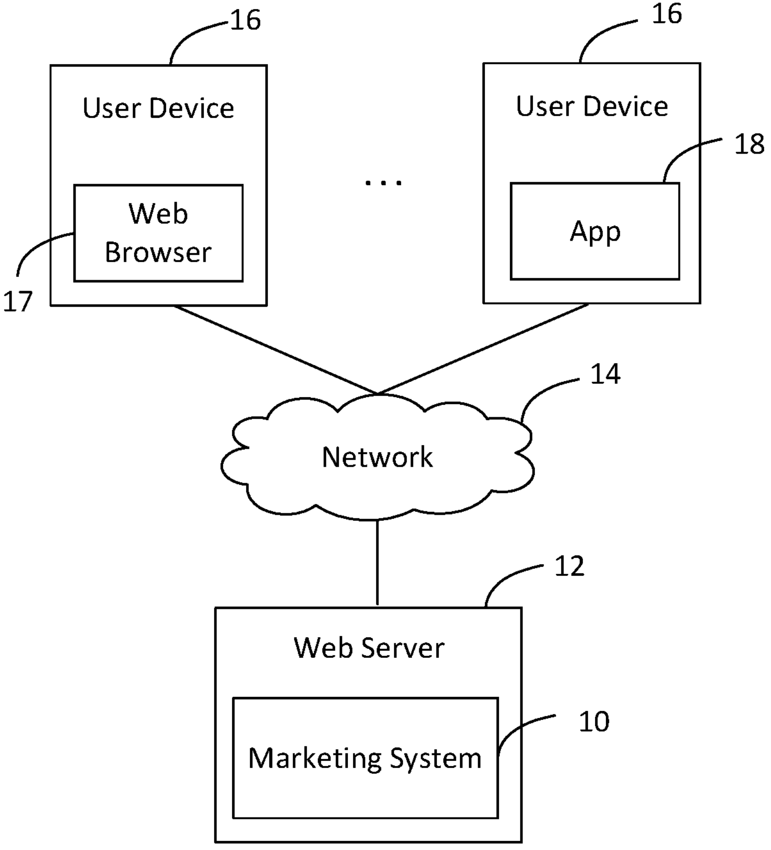
FIG. 1 is a block diagram illustrating a marketing system in accordance with some embodiments of the present disclosure.

The present invention generally pertains to systems and methods for improving the distribution of marketing events to a digital media user in circumstances where marketing can be conducted over a plurality of channels, and in particular, digital channels. In some embodiments of the present disclosure, a method is described for determining whether to advertise over a specific marketing channel through an aggregate consideration of the predicted return on investment from each of a plurality of available channels. First, a channel-specific budget value (e.g., a dollar amount) for advertisement to a customer is calculated for each marketing channel, the channel-specific budget value setting a total value to spend when marketing to the customer over one particular channel. This channel-specific budget value may, in some embodiments, be set to a value (e.g., a dollar amount) less than a predicted return on investment from the customer's response to a marketing communication over that single channel in isolation. The channel-specific budget values for different channels may be specific to the same particular potential customer, taking into account, for example, that customer's previous activity with the advertiser (e.g., purchases made in the past) in response to marketing over the channel, information about the customer (e.g., demographic information), the customer's previous response to marketing events over that channel, and/or other appropriate factors. A channel-specific logic may be used to perform this calculation, and each of the channel-specific logics function discretely from the other(s). A global budget value may be calculated with respect to the customer, the global budget value being a total amount the advertiser wishes to spend on marketing toward the customer over all possible channels, i.e., a multi-channel or total budget. In some embodiments, the calculations made in determining the channel-specific budget values feed into the calculation of the global budget value, as a weighted aggregate consideration of the channel-specific determinations. In addition to the channel-specific budget values, in some embodiments, the logic for the global budget calculation may also take into consideration information specific to the particular potential customer, such as customer's previous activity with the advertiser and/or demographic information. Further, in the preferred embodiment, the calculation of the global budget value considers "overlap" effects of advertising to the same potential customer over multiple channels.

In preferred embodiments, the global budget changes as marketing events occur over the various channels. When a marketing event is performed on a potential customer, that customer's response to the marketing event, if any, is evaluated. Based on this response, the global budget value may be adjusted for that user. In some instances where no response was incited, the cost of marketing may simply be deducted from the global budget. In some instances where a positive/negative response was incited from the customer, the total budget may be additionally or alternately adjusted upward/downward. In some instances where a purchase is made in response to the marketing event, the total budget may be set to zero. The preferred embodiment resets the global and channel-specific budgets after a certain period of time, typically a predetermined amount of time after a purchase is made. However, other actions are possible in other embodiments, such as a reduction in the global budget value, or the implementation of a wait period or a condition until another marketing event is delivered, among other things.

The system for calculating the channel-specific values and/or global budget value may also, in some embodiments, apply machine learning techniques to identify appropriate weights to assign to user activity, channel activity, and factors contributing to "overlap." The logic may be trained to identify patterns of behavior by a potential customer in response to different types of marketing over different channels. As one example, one such logic may be used to predict that customers of a certain demographic may respond more positively to marketing over a particular channel than another.

In another aspect of the present disclosure, advertising is managed on the basis of the channel-specific and global budget calculations. In general, keeping with a preferred embodiment, if the global budget exceeds the cost of marketing via a specific channel, the marketing event on that channel is initiated and the money is invested on that marketing event is deducted from the total budget. If there are potential other marketing events that are desired to be conducted, the exemplary system considers the remaining available global budget to determine whether to market.

FIG. 1 depicts a marketing system 10 for delivering advertisements to a user (a potential customer) through a plurality of digital media, in accordance with an embodiment of the present disclosure. As shown in FIG. 1, the marketing system 10 may be implemented by a web server 12 or other type of device or system that is coupled to a network 14. Network 14 may comprise one or more network types, such as a local area network (LAN) or a wide area network (WAN). In some embodiments, the network 14 comprises at least the Internet, but other types of networks or combinations of networks are possible in other embodiments. Marketing system 10 and web server 12 are managed or facilitated (and in some embodiments, owned) by an advertiser. An advertiser may be generally understood as an individual or organization interested in delivering a marketing event to a potential customer via a marketing channel. In some embodiments, the advertiser may be a merchant or entity that uses or runs an e-commerce website or app, through which customers may buy, sell, rent, lease, and/or otherwise purchase or subscribe to the advertiser's products or services. In one exemplary embodiment, the advertiser may provide an online reservation system that shows listings of properties, such as houses, condominiums, rooms, apartments, lots, and other real estate that has been offered for reservation and that may be reserved for a specified time period (e.g., a day, week, month, or other period of interest). In such a scenario, the activity of a customer in response to a marketing event may include the booking of a reservable property. In some embodiments, the activity of the customer may include one or more types of interaction with the online reservation system that do not involve a booking, such as creating an account, searching an index of properties, or viewing a listing for a property, among many others.

Other embodiments may involve marketing entities that do not buy or sell products or offer services, however, for ease of reference, all such entities are referred to herein as "advertisers" and their targets for communications are referred to herein as "customers." In this regard, it will be understood that while the present disclosure may in some instances refer to property listings and the lease or rental of properties through the booking of a property listing, or to the purchase of a product on an e-commerce website, the systems and methods described herein are not so limited. Rather, the techniques described in the present disclosure can be applied to any e-commerce provider and/or any entity that delivers marketing, promotional, or information material to users (whether individual, groups, or corporations/organizations) over a plurality of distinct digital channels.

As shown by FIG. 1, user devices 16 may be used by individuals or entities (referred to herein as "users" or "customers") to access, view, and take action in response to content delivered to the user from the web server 12. Each user device 16 may be implemented by one or more computing devices, such as a smartphone or other hand-held device (e.g., a tablet or reader), desktop computer, laptop computer, or any other appropriate device capable of receiving, processing, and outputting digital information. In a preferred embodiment, the user device presents information to a user via a display, and takes input from the user in relation thereto (for example, through the display of interactive graphics or hyperlinks) via a touchscreen, mouse, keyboard, stylus, or any other appropriate input device. As shown by FIG. 1, each user device 16 may have installed a web browser 17 and/or other appropriate application(s) 18 that can be used to communicate (receive and transmit) with the web server 12 via the network 14. In some embodiments, an application 18 may be a mobile application or other software application distinct from a generic web browser, such as an e-mail, messaging, or social media application, an application specific to the advertiser or an e-commerce business, or another program capable of receiving digital content from the marketing system 10 and delivering such content to the user of the device. In this regard, the web server 12 may provide one or more advertisements or other marketing content that is displayed by a user device 16 via the browser 17 and/or app 18. Advertisements and other marketing content may be delivered to users directly or indirectly through a third party service that delivers the advertisement, which is provided or instructed to the third party by the advertiser. It will be noted that while FIG. 1 illustrates a one-to-one correspondence between a user device 16 and one of a web browser 17 or app 18, the preferred embodiment is not so limited. For instance, a user device 16 may in one embodiment be a smartphone on which several apps 18 are installed (e.g., Facebook, web browser, e-commerce app, etc.), each of which may serve as a discrete channel over which advertisements may be displayed. Further, while FIG. 1 illustrates only two user devices 16 connected to network 14, it may be understood that any number of users may be connected in different embodiments.

Figure 2:
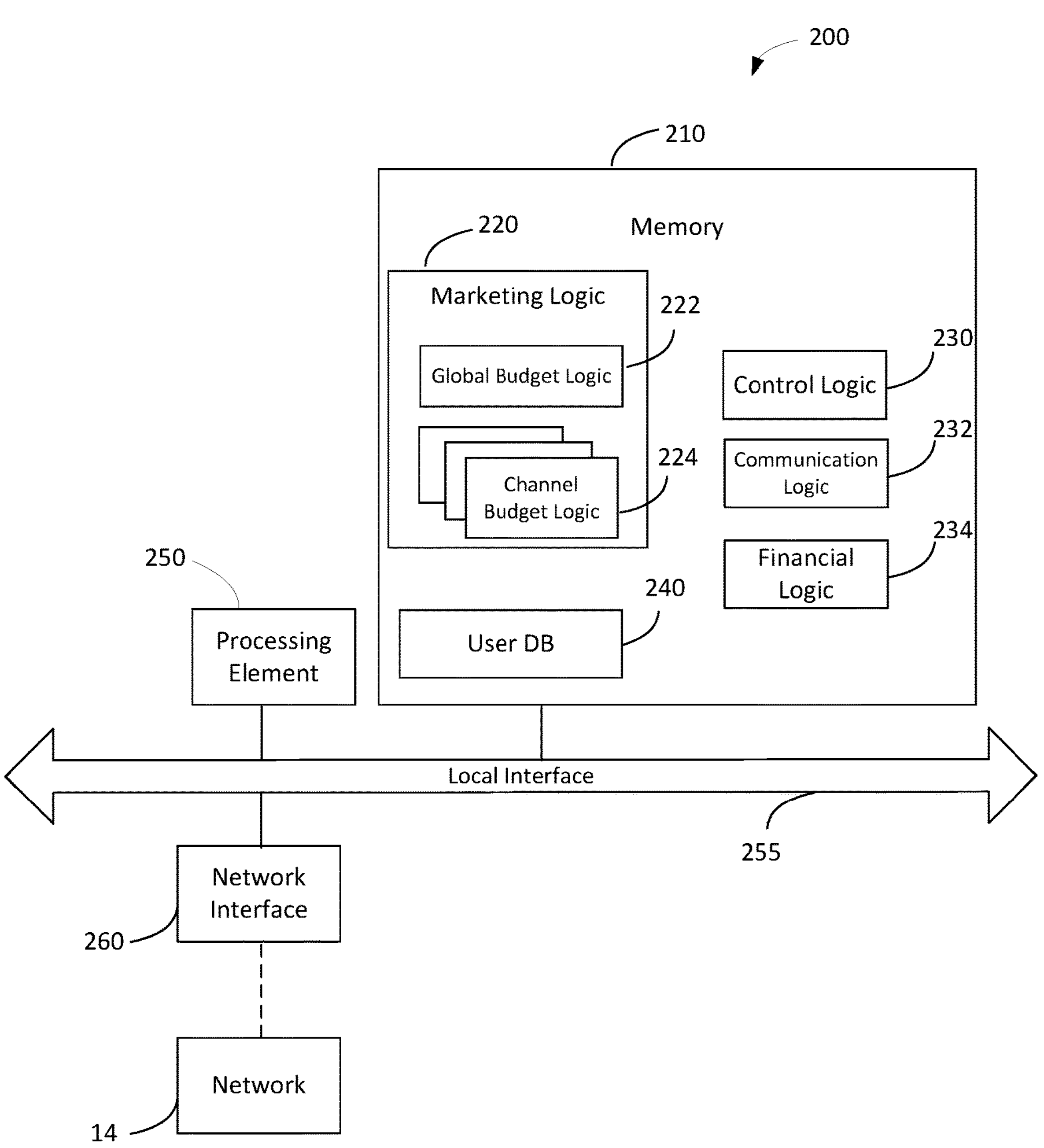
FIG. 2 is a block diagram illustrating a marketing delivery system in accordance with some embodiments of the present disclosure.

FIG. 2 depicts an example schematic diagram of components of a marketing delivery system 200 in accordance with some embodiments of the present disclosure. The marketing delivery system 200 may include a memory 210. As used herein, memory 210 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Memory 210 may store various instructions used in the systems and methods described herein. While FIG. 2 illustrates a single memory 210, it will be understood that the embodiments described herein are not limited to a particular arrangement and other embodiments may store information in one or more memories, some local to the other components illustrated in FIG. 2, and some may be memories shared with, or geographically located near, other computing systems. In the illustration of FIG. 2, memory 210 stores a marketing logic 220, the marketing logic containing one or more channel budget logics 224, each for determining a marketing resource budget that may be spent on a user with relation to a respective advertising channel (that is, a "channel-specific" budget), and a global budget logic 222, for determining a total marketing budget that may be spent on a user with relation to the totality of available marketing channels. The capabilities of the channel budget logics 224 and the total budget logic 222 are described in greater detail below.

The marketing delivery system 200 may include control logic 230 for generally controlling the operation of the marketing delivery system 200, and financial logic 234 for communicating with a financial database (not shown) located on a separate or remote server. The marketing logic 220 may also, in one embodiment, include communication logic 232 for obtaining information from or communicating information to a variety of third party systems via network 14. While communication logic 232 is illustrated as being a separate logical component, in an alternative embodiment, the marketing delivery system 200 may include communication logic 232 as part of marketing logic 220 or control logic 230. In another alternative embodiment, the communication logic 232 may communicate with third party systems and coordinate with the control logic 230 to build an internally-stored advertising database (not specifically shown) containing, e.g., advertising and cost summary data. Memory 210 may also in some embodiments include a user database 240 configured to store metrics related to one or more users in relation to their profile and/or activity with the advertiser's systems. The various described logics stored in memory 210 may read data from or write data to the user database as part of their respective calculations.

In some embodiments, the marketing delivery system 200 may be implemented in whole or in part as a machine learning system (e.g., neural network software) for achieving the functionality described herein. In one embodiment, global budget logic 222 and/or the channel budget logics 224 of the marketing logic 220 may be implemented at least in part as a machine learning algorithm for determining an estimated ROI and/or intended investment value for marketing toward a user over a particular channel, or a plurality of channels, a process described in more detail below. While, in the illustrated embodiment, each of marketing logic 220, control logic 230, communication logic 232 and financial logic 234 is depicted as part of marketing delivery system 200, these logical components need not be so configured, and in other embodiments, other configurations of the various components, within marketing delivery system 200 or distributed over one or more computing systems, are possible.

Marketing logic 220, communication logic 232, control logic 230, and financial logic 234 may be variously implemented in software, hardware, firmware or any combination thereof. In the exemplary marketing delivery system 200 shown in FIG. 2, marketing logic 220, control logic 230, communication logic 232, and financial logic 234 are implemented in software and are stored in memory 210 of the marketing delivery system 200. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus.

The logics of the exemplary marketing delivery system 200 depicted in FIG. 2 may be executed by at least one conventional processing element 250, such as a central processing unit (CPU), digital signal processor, other specialized processor or combination of processors, or other circuitry that communicates to and drives the other elements within the marketing delivery system 200 via a local interface 255, which can include at least one bus. As an example, the processing element 250 may execute instructions of software stored in memory 210, such as control logic 230, marketing logic 220, communication logic 232, and financial logic 234. While FIG. 2 illustrates one processor 250 which implements all of the various logics in the marketing delivery system 200, it is possible in other embodiments for the server 200 to employ multiple processors. In one such alternate embodiment, discrete processing elements may be used for each of (or any subset of) the respective channel-specific logics 224 and for the global logic 222. In some embodiments, the processing element 250 may comprise an artificial neural network or other type of configuration for performing machine learning functions based on instructions stored in memory 210. Furthermore, the marketing delivery system 200 may have a network interface 260 for exchanging data with the network 14 (FIG. 1).

Figure 3A:
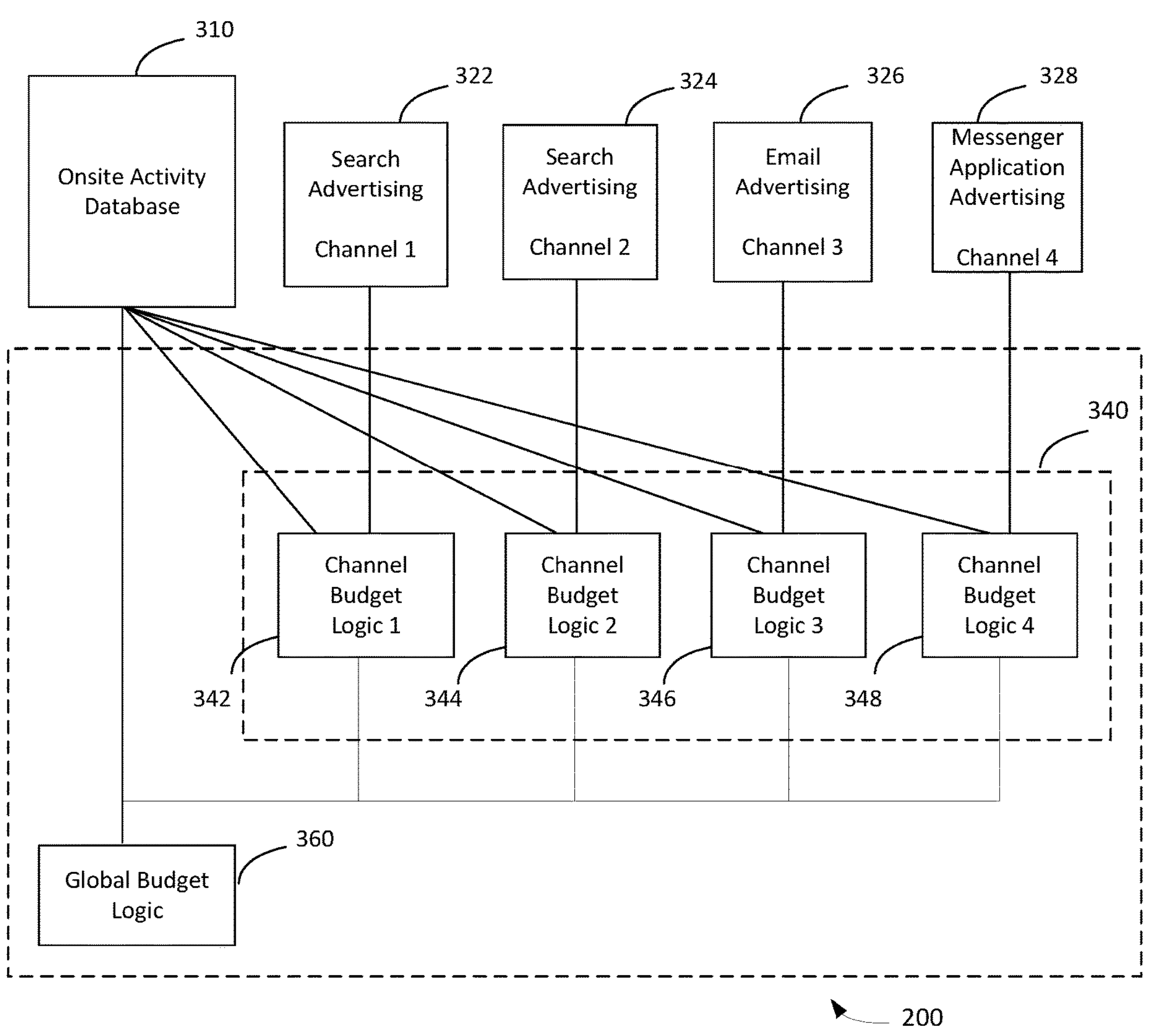
FIG. 3A is a block diagram illustrating a system for calculating a global budget value associated with a user, in accordance with a first embodiment of the present disclosure.
Figure 3B:
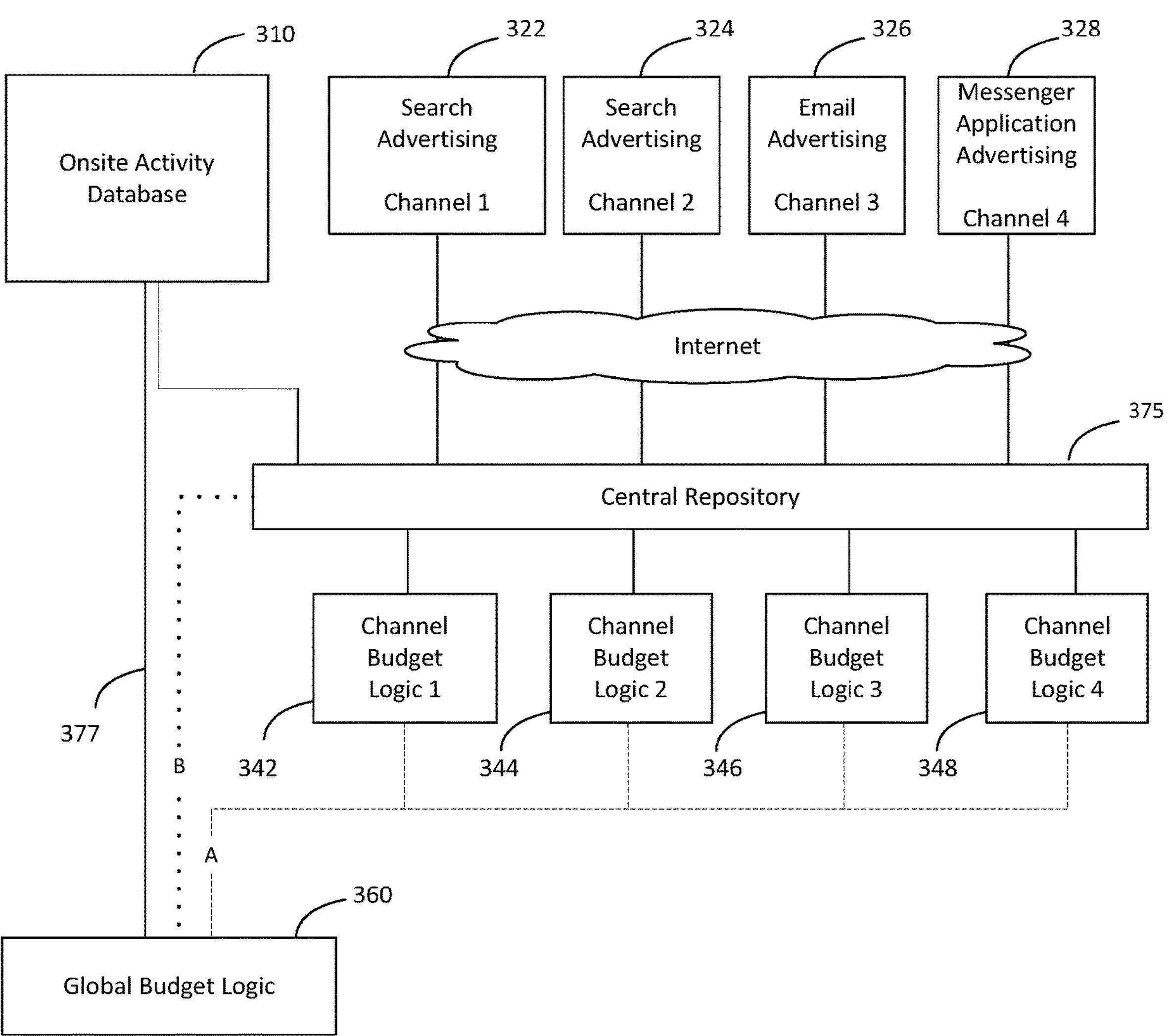
FIG. 3B is a block diagram illustrating a system for calculating a global budget value associated with a user, in accordance with a second embodiment of the present disclosure.

FIGS. 3A and 3B illustrate various configurations of a system and method for managing marketing investment over multiple marketing channels based on global and channel-specific investment models. With reference to FIG. 3A, four channels for marketing are used, labeled as channels 1-4. In the example of FIG. 3A, Channel 1 corresponds to a first search-based advertising channel (such as, e.g., Google Ads), Channel 2 corresponds to a different search-based advertising channel (such as, e.g., Facebook Ads), Channel 3 corresponds to e-mail, and Channel 4 corresponds to a messenger application. In a preferred embodiment, the marketing channels of the systems and methods described herein will encompass all of the marketing channels available to be accessed by the user and/or available to the advertiser, however, in other embodiments, the channels may be limited for any reason. In some embodiments, for example, the system may not consider marketing channels that the advertiser has considered to be unavailable or impractical (e.g., because of expense). In other embodiments, the system may limit the marketing channels based on user preferences, e.g., channels that a user has opted into or out of. It will be understood that the embodiments herein do not necessary need to correspond to a particular number of channels, so long as marketing events can be delivered over more than one channel, and that no particular configuration or types of channel are required.

In a preferred embodiment, each of those channels for marketing may correspond respectively to a third party data repository 322, 324, 326, or 328. In a preferred embodiment, each of these data repositories is remote to the advertiser's servers; for example it may be hosted by a third party who manages the search, e-mail, and/or messaging solutions. In other embodiment, the data repositories are part of the advertiser's network and may each be connected to a respective network interface (not shown) that pulls data from third party systems. The data stored in these repositories is related to one or more customers or target customers of the advertiser. Here, "customer" may correspond to any person or entity that the advertiser wishes to target with a marketing event, with the goal of eliciting an action, even if no "purchase" is made or intended to be made.

The data stored in repositories 322, 324, 326, 328 may provide data about marketing events delivered to the customer over the associated marketing channel, data about the customer's actions over the channel, and/or data associating a customer's action(s) to a particular marketing event. A marketing event may take a variety of forms, such as the delivery of a written, graphical, or video advertisement, or another type of communication such as a periodic bulletin, notice of an event or sale, a request for donation, an informational notice, a notification of an online or digital presence, and informational notice, or any messages or media that are communicated to the market. In the case of the exemplary embodiments, a marketing communication is considered with respect to its delivery to a single person or entity: the targeted customer or user. Different marketing events may target different responses from the potential customer. For example, they may involve communications encouraging the customer to follow a link to the advertiser's website to view information, create an account, search for products/services, or otherwise interact with the website, and/or to use the advertiser's service to buy or sell a product, or to make a reservation or donation, among other things. As another example, the marketing communication may not supply a link (e.g., if a text-only message is used) and instead may provide a number or code that the customer can apply when later interacting with the advertiser. The advertiser may also seek to encourage action outside of the advertiser's server, for example by sharing the content of the advertisement on a social media platform. In other embodiments, the advertiser may simply be seeking to inform the customer, in which case the responsive action may include reading the content of the communication and/or indicating their understanding or approval. While marketing events may take any of these forms in different embodiments, for ease of reference herein, an exemplary marketing event may be understood as a delivery of an advertisement to a user, with the goal of encouraging the customer to interact with the advertiser site and/or make a purchase in response to the advertisement. In an exemplary embodiment, there is some information in the advertisement (e.g., a link or code) that allows for either the third party managing the marketing channel or the advertiser (at their server) to associate the customer's activity on the advertiser's website or on the channel with the marketing event that prompted the customer's activity. As one example, a third party search service provider may be able to deliver an advertisement and then store data indicating that a user of the search service clicked on a particular advertisement. The advertiser may derive, therefore, that the customer was motivated to act in response to the delivered advertisement.

In a preferred embodiment, system 200 may access channel-specific data about customer responses to the marketing events on different marketing channels from third party repositories 322, 324, 326, 328 (corresponding respectively to Channels 1-4). In particular, system 200, via communication logic 232 (FIG. 2), may use APIs provided by those third party search services to obtain channel-specific data from the third party systems 322, 324, 326, 328, however, other methods of data collection may alternatively be used. This channel-specific third party data may include, for example, information indicating whether and when one or more advertisements were delivered to user (that is, the timing of the occurrence of a marketing event(s)), and click/view/share data comprising a number and timing of user clicks/views/shares made for a particular marketing event on the marketing channel, the number of impressions of the advertisements on the user, the length of time for which the advertisement is displayed to the user and/or the ad is viewed, or the position of the ad on the user's display. The channel-specific data may also, in some embodiments, include the user's activity on the channel generally, such as, e.g., the frequency with which they use the channel, their level of engagement, and their general responsiveness to marketing events or notifications on that channel, among other things. As one example, channel data specific to Facebook may indicate whether a person uses Facebook often or infrequently and their level of participation when they use Facebook, such information potentially suggesting a likelihood that the user may respond to a particular marketing event delivered through Facebook. In some embodiments, the channel-specific data may also include demographic data about the user, such as the user's GPS or location data, the user's operating system, browser, or device data, user preferences or user information publically shared with/over the third party channel, and the like.

With reference to FIG. 3A, system 200 may also include an onsite activity database 310, which stores advertiser-specific information, that is, information related to onsite activity by the user at the advertiser's website. It will be understood of course that the data is not limited to activity on a website but may include any interaction with the advertiser, such as use of the advertiser's application, or engagement with the advertiser over social media. The data in onsite activity database 310 may indicate, for example, whether and when a user accessed the advertiser's site, and took action on the website, such as, in the case of an e-commerce site, creating an account, searching for a product/service/information, and/or making a purchase. In one exemplary embodiment, where the advertiser provides a platform for property rental, the onsite activity database may store information about the customer interactions therewith, such as the customer's searches or filters for specific characteristics, whether and how long a user views a property listing, whether the user views maps or searches within particular geographic regions, the frequency of user searches, and how any of these factors may be associated with the user's history of purchases/bookings, among other things. In some embodiments, for example in a case that the marketing activity was an email with a hyperlink to the advertiser's website, the data in onsite activity database 310 may identify a clicked-upon hyperlink, and may further identify redirect information or other character strings therein indicating the specific advertisement or marketing event containing the link. In an exemplary embodiment, both the onsite activity database 310 and the system 200 are managed by the advertiser so as to be connected to a local network; however, other configurations may be possible in other embodiments, as long as system 200 is able to read data from the advertiser database 200.

Onsite activity database 310 may also, in some embodiments, contain information about the customer or demographic data. For example, the customer may have created an account or otherwise provided information to the advertiser, in which case the onsite activity database 310 may contain information such as customer name, location, preferences, purchase history, or demographic information, among other things. In addition, in some embodiments, information about the customer may be obtained (e.g., by the advertiser or by a third party channel provider) based on cookies, GPS or location data, device data (e.g., operating system or device make/model) or other data customarily made available by a customer's device(s), application(s), or opt-in preferences. Such data may, in some embodiments, be stored in the onsite activity database 310 or in another data repository managed by the advertiser or a third party.

Of note, while the term "database" or "repository" is used with reference to advertiser database 200 and third party systems 322, 324, 326, and 328, these components are not so limited nor is any particular form or configuration of data storage mandated, and the described "databases" may alternatively be an indexed table or any other appropriate data structure.

The advertiser, through a combination of channel-specific data collected through the onsite activity database 310 and/or the third party repositories 322, 324, 326, 328, may therefore be aware of which advertisements (or other marketing events) were delivered to a particular potential customer over which marketing channel, how frequently those advertisements were delivered to the customer, whether and when the customer clicked or otherwise interacted with the advertisement, and/or what actions the customers took with the advertiser in response thereto. This information is stored so as to be accessible to the channel-specific and global budget models in a manner described in greater detail below.

In the embodiment of FIG. 3A where four marketing channels are available for reaching a user, marketing delivery system 200 maintains at least four channel budget logics 1-4 (labeled as 342, 344, 346, and 348, and also referred to herein as "channel-specific budget logics") corresponding to Channels 1 through 4, respectively. Each channel budget logic takes in data from the onsite activity database 310 and a respective one of the channel-specific systems 322-328.

An exemplary channel-specific budget logic 342 relating to a first marketing channel, Channel 1, is described herein. Channel-specific budget logic 342 is directed to the calculation of a value (in a preferred embodiment, a dollar value) representative of a maximum budget the advertiser intends to spend on marketing to a customer over Channel 1. Put another way, the channel-specific budget is an investment value for Channel 1, setting an upper bound of expenditure for that customer. Each time a marketing event is performed over Channel 1, the channel-specific budget logic 342 decreases the channel-specific budget by a corresponding amount, and if at any time, the channel-specific budget value falls below the cost of conducting a marketing event, that market event is not performed. In some embodiments, the channel-specific budget logic 342 may instead be decreased by a value calculated based on the expenditure, such as a percentage thereof, or by a capped value. For instance, in an alternate embodiment, where the cost of expenditure is very large or variable, the amount deducted from the channel-specific budget may be limited to a particular representative value, such as, e.g., $10, thus allowing for flexibility of expenditure.

In the preferred embodiment, the channel-specific budget value has an association to a "reward" value that the advertiser expects to receive from the customer; that is, in a preferred embodiment, a predicted return on investment (ROI) that the advertiser expects to see based on the actions of the customer in response to the marketing event. If the channel-specific budget logic predicts that, in response to marketing over the channel, a customer will spend a certain amount making a purchase, then the channel-specific budget value will be less than that amount. As one example, if channel-specific budget logic 342 predicts that a customer will purchase $8 worth of product from the advertiser based on an advertisement delivered over marketing Channel 1 (which may be, for example, a search-based advertisement, such as Google Ads), the channel-specific budget value may be set to, e.g., $6. In a preferred embodiment, the difference, if any, between the expected ROI and the value set as the channel-specific budget value may correspond to a predetermined coefficient or a percentage of profit that the advertiser wishes to obtain, thereby improving the odds that an advertiser does not lose money by investing in advertising. In other embodiments, the difference in values may correspond to a set dollar value rather than a percentage, or may be the result of an application of a variable coefficient, such as a sliding or otherwise inconsistent percentage scale. In yet another embodiment, the predetermined coefficient setting the difference between the ROI and the channel-specific budget value may rely upon characteristics of the customer and/or of the anticipated purchase, such as the location of the user, or whether the user is expected to make repeated or bulk purchases, etc. In a preferred embodiment, the same predetermined coefficient is applied in the calculations performed by all of the channel-specific budget logics 342, 344, 346, and 348, however, in other embodiments, different coefficients may be applied to calculations targeting different channels.

Alternate embodiments may provide a channel-specific budget value that is not a dollar amount. For example, in some embodiments, the channel-specific budget value may be a "counter" of potential marketing events, where the counter is decremented after a marketing event occurs. Such an implementation may be particularly valuable where the cost of the marketing event is negligible or difficult to calculate (such as text messaging or e-mails sent from the advertiser's server(s), where the cost may be a resource cost).

When calculating the channel-specific budget, the channel-specific budget logic 342 uses information about the customer's onsite activity with the advertiser (from the onsite activity database 310) as well as the customer's activity with a marketing channel, such information being stored in a respective third party repository 322-328. The channel-specific budget logic 342 corresponds to an investment value over a single marketing channel, such as Channel 1, and therefore data relevant only to other channels of communication (Channels 2 through 4, in the example of FIGS. 3A and 3B) and not to Channel 1 are not considered in the processing of logic 342.

Based on this information, channel-specific budget logic 342 may compute an output Y, which corresponds to the channel budget value. In one embodiment, channel-specific budget logic 342 may use the following exemplary equation:

$$Y = p*(w_1a_1 + w_2a_2 + \ldots + w_na_n) \quad (1)$$

Exemplary Equation (1) calculates a weighted sum of factors (described below) that are specific to the user's interaction with the marketing channel and their interaction with the advertiser. In Equation (1), Y is the budget value, p is the predetermined coefficient, $a_1$ through an are factors relevant to user data, advertiser data, and/or third party data (described in greater detail below), and $w_1, w_2, \ldots, w_n$ are respective weights assigned to those factors.

Factors $a_1$ through an may be understood as characteristics specific to the customer, his interaction with the third party marketing channel, and/or his interaction with the advertiser systems. As one illustrative example, with reference to Equation (1), factor $a_1$ might reflect a number of purchases that the customer has made, in a given period of time, via the advertiser's website (i.e., frequency of purchase). Factor $a_2$ might reflect, for example, a total time (in seconds) spent by the customer on the advertiser's website or app. Factor $a_3$ might reflect, for example, an average or representative value of the goods or services that the customer purchased, every time a purchase was made (amount of purchase). Factor an might reflect, for example, demographic information about the customer, such as the customer's age. While these example factors have numeric values, a factor need not be inherently numeric, and instead, may be assigned a corresponding number. For example, an might reflect an age range of the customer rather than a strict numeric age, such that, e.g., a first range of ages 0-18 corresponds to 0, a second range of ages 19-30 corresponds to 1, etc. As another example, factor $a_{n-1}$ might reflect a country of residence, where specific regions or countries are assigned to values 0, 1, 2, etc. Similarly, factor $a_{n-2}$ might reflect the customer's historical purchase pattern (e.g., seasonal purchases), where a value may be assigned based on whether and how the timing of a marketing event aligns with a purchase pattern.

As shown in Equation (1), a weight (of weights $w_1, w_2, \ldots, w_n$) may be applied to a factor an. A weight may be any value, positive or negative, a positive weight causing a factor an to contribute positively to the channel-specific investment value Y, and a negative weight contributing negatively. In one embodiment, weights $w_1, w_2, \ldots, w_n$ range from −1 to +1, however, in other embodiments, the values are not so limited. For example, where factors $a_1$ through an are as described above, and where $w_1$ is 0.05, $w_2$ is 0.3, and $w_{n-2}$ is 0.02, it will be understood that factors $a_1$ (number of purchases, to which $w_1$ is applied) and $a_2$ (time spend on the website, to which $w_2$ is applied) contribute positively to the calculation of Y (thereby increasing the ultimate budget), with the $a_2$ contributing more substantially, while $a_{n-2}$ (purchase pattern, to which $w_{n-2}$ is applied) contributes negatively (decreasing the ultimate budget). The above examples are of course merely for purposes of explanation, and any appropriate factor, weight value, and/or corresponding numbers may be assigned in different embodiments, based on the information available from database 310 and third party repositories 322-328.

In one embodiment, channel-specific budget logic 342 may contain logic that applies machine learning techniques to identify, in real time or approaching-real time, predictive values for the weights $w_1, w_2, \ldots, w_n$. These predictive values may be based on, e.g., historical patterns in customer activity (across all of the advertiser's customers) that share commonalities with the factors relevant to a particular customer. The logic may then compute a predictive channel-specific budget value using the techniques described above.

While other channel-specific logics 344, 346, 348 may vary slightly (for example in their weighting), it may be understood that the same general principles are applied in each of the channel-specific budget logics Y. In this manner, for a totality of i channels, a plurality of budgets $Y_i$ are calculated.

The determination of an exemplary global budget value is described below. The global budget logic 360 is directed to the calculation of a value (in a preferred embodiment, a dollar value) representative of a maximum budget that the advertiser intends to spend on marketing to a customer over all of the channel, that is, the total or global budget across all channels. Where, as in FIGS. 3A-3B, there are four total marketing channels available to the advertiser, the global budget logic 360 considers data regarding all four channels, as well as data in the onsite activity database.

In a manner analogous to the channel-specific budgets described above, the global budget value may reflect the application of a coefficient to a predicted ROI that is expected to be seen from advertising to the customer across all channels. As described above, the applied coefficient may be, in a preferred embodiment, a predetermined coefficient or a percentage of profit that the advertiser wishes to obtain, or may in some embodiments be a variable, sliding, or otherwise inconsistent value. In one embodiment, the coefficient applied to calculate the global budget value may be the same as the coefficient(s) applied to the channel-specific budget values, however, different coefficients may be applied in different embodiments.

In generating the global budget value, the global budget logic 360 uses both information about the user's onsite activity with the advertiser (from the onsite activity database 310) and the calculated channel-specific budget values (calculated by channel-specific budget logics 342, 344, 346, 348). In some embodiments, the global budget logic 360 may use data about the user's activity with the third party systems 322-328 that was not specifically referred to by the channel-specific budget logics, however, the same or a subset of the same data may be used by both the global and channel-specific calculations. In one embodiment, the calculated results of the channel-specific logics feed into global budget logic 360, as illustrated in FIG. 3A or as illustrated in FIG. 3B as path A (dotted line). In an alternate embodiment, illustrated in FIG. 3B, data collected from third party repositories 322-328 may feed into a central repository 375 that serves as a data source for the calculations of both the channel-specific logics 342-328 and the global budget logic 360, which logics each perform their own respective calculation on the data from the third party repositories. The path from the central repository to the global budget logic is labeled as path B in FIG. 3B, illustrated as a dotted line. In yet another embodiment, with reference to the configuration of FIG. 3B, the calculated results of the channel-specific models, instead of feeding into the global budget logic, are stored in the central repository 375, and the global budget logic 360, rather than using just the channel-specific third party data via path A, may additionally or alternately rely upon the calculated results of the channel-specific logic(s) stored in the central repository 375 via path B. As another alternate embodiment (not specifically shown), the third party repositories 322-328 themselves may directly send information to both the channel-specific logics and the global logics (e.g., repository 322 for Channel 1 feeds directly into both channel budget logic 342 and global budget logic 360), and no central repository 375 is used. In such an embodiment, the potential for duplicative calculation may be balanced by the reduced need for storage of the third party data in an intranet-connected repository and/or cache. For example, in a circumstance where the data collected from the third party repositories 322-328 is too large to store indefinitely, but may still be processed efficiently to calculate the various budget values, a central repository 375 may not be strictly needed. The global budget logic also may pull data from the onsite activity database 310 via path 377. In either of the embodiments of FIGS. 3A and 3B, or in any alternate embodiment, it will be generally understood that the global budget logic 360 has access to the information from the onsite activity database 310, as well as either or both of the information provided to the channel-specific budget logics from the third party systems and the respective calculated outputs of the channel-budget logics 342-348.

Based on this information, global budget logic 360 may compute an output Z, which corresponds to the global budget value, using the following exemplary equation:

$$Z = p*\left(\sum_{i=1}^{c} Y_i - w_1 b_1 - w_2 b_2 - \ldots - w_m b_m\right) \quad (2)$$

The value p is the predetermined coefficient, the value c is the total number of marketing channels available to the advertiser, and each value $Y_i$ is the channel-specific budget value calculated by a corresponding channel-specific budget logic (one of 342, 344, 346, 348 in FIGS. 3A-3B). In the examples of FIGS. 3A-3B, c is equal to four, such that four channel-specific $Y_i$ values ($Y_1$ through $Y_4$) are used in the summation. The values $w_1b_1$-$w_2b_2$ . . . $w_mb_m$ are overlap values, each representing a respective detrimental effect or interference effect that other marketing channels and marketing events on other channels may have on the relevant channel i of the summation. Values $b_1$, $b_2$, . . . $b_m$ can be understood as numeric representations of overlap factors (described in greater detail below). Weights $w_1$, $w_2$, . . . , Wm are analogous to (though need not be the same as) the channel-specific weights described above with respect to Equation (1), each weight signifying the relative important of the overlap factor represented by a value $b_m$.

The number of overlap factors may depend in part on the number of channels c that the advertiser may access to market to a customer. In general, if a customer is being marketed to over a greater number of channels, an ROI for marketing over the totality of channels may have diminishing value with respect to investment. Put another way, in any circumstance where a prospective customer may be reached over more than one marketing channel, the potential for overlap, or negative/adverse interaction, between marketing over the channels exists.

As one illustrative example, with reference to Equation (2), where i=1 (Channel 1), factor $b_1$ might be a binary value (0, 1) representing whether a user was marketed to in both channel 1 and channel 2, factor $b_2$ might be a binary value (0, 1) representing whether a user was marketed to in both channel 1 and channel 3, and factor $b_3$ might be a binary value (0, 1) representing whether a user was marketed to in both channel 1 and channel 4. Additional factor $b_4$ might be, for example, the number of times the user was marketed to on both channel 1 and channel 2 within a specific time period (e.g., within 1 week, or within all of a subset of the period in which the user has historical activity with the advertiser), and factor $b_5$ may be a number representative of a total number of marketing events. In one embodiment, a factor $b_6$ may be a number of customer interactions in response to marketing events (such as, e.g., clicks, subscriptions, or the like). Factors $b_7$ to $b_m$ might represent various different types of interactions between marketing channels, and any appropriate factor may be considered in different embodiments. Factors $b_1$ to $b_m$ may be selected to best represent characteristics of the advertiser, the industry in which the advertiser operates, characteristics of the user, and/or activities that may occur over the various marketing channels 322-328. As can be seen in the examples above, a factor need not be inherently numeric, and instead, may be assigned a corresponding number.

Weights $w_1$ through $w_n$ may be any positive or negative value, a positive weight causing a corresponding factor b to contribute positively to the global budget value Z (thereby increasing the ultimate budget) and a negative weight causing a corresponding factor b to contribute negatively (decreasing the ultimate budget). In one embodiment, the weights may range in value from −1 to +1, however, in other embodiments, the values are not so limited. Weights may vary in value even where the type of factor $b_m$ is similar. As one example, the global budget logic 360 may determine that an interaction between email marketing and video marketing is low, for example, if different information is presented through the use of different media (text/video) over different channels, in which case the weight $w_m$ may be relatively low. In contrast, the global budget logic 360 may determine that an interaction between email marketing and marketing over a messenger application is high, for example where the information presented to the customer is solely text-based and/or redundant, in which case the weight $w_m$ may be relatively high, and the total budget will be decreased by a larger amount. It will be understood that the above examples are of course merely for purposes of explanation, and any appropriate factor, weight values, and/or corresponding numbers may be assigned in different embodiments, based on the information available from database 310, third party repositories 322-328 and/or central repository 375. By these means, the global budget logic 360 considers a greater amount of information than any of the channel-specific logics. For instance, in addition to considering data from the onsite activity database 310 and all of the third party repositories, the logic 360 also considers the calculated budgets of each of the channel-specific logics 342, 344, 346, 348, as well as interaction between different combinations of one or more channels.

In a preferred embodiment, once a global budget value has been calculated, the system may wish to adjust the global budget value as marketing events occur over the various channels. In such an embodiment, when a marketing event is delivered to a potential customer, that customer's response to the marketing event, if any, is evaluated. Based on the response, the global budget value may be adjusted for that user. In some instances where no response was provoked, the cost of marketing (or, in some instances, a representative value calculated based on the cost of marketing, such as a percentage thereof or a capped value) may simply be deducted from the global budget. In instances where a negative response was provoked (e.g., an ignoring of a marketing communication (left unread), closing, blocking, or skipping an advertisement, an opt-out or unsubscribe to advertisements), the total budget and/or one or more channel-specific budgets may be additionally or alternately adjusted downward, as the customer is assumed to have low intent to make a purchase (or otherwise take a desired action). In instances where a positive response was provoked (if, for example, the customer clicked on the advertisement, and/or took some action on the advertiser's website or on a third party site in response to the advertisement), the total budget may be adjusted upward or downward, depending on whether the action suggests additional marketing would be beneficial. Individual types of positive/negative responses correspond to different values or percentages by which the global budget is adjusted, based on how strongly they influence the advertiser to continue marketing to that customer.

Data from the onsite activity database 310 and the third party databases for each of the channels 322, 324, 326, 328 may also contain information that drives the selection of the factors $b_1$ to $b_m$ and/or the weighting thereof. For example, where such data indicates, e.g., that the customer rarely logs into an account for Channel 1 or is otherwise uninterested (e.g., databases 322-328), that a marketing event has recently happened (e.g., databases 322-328), or that the customer has recently visited or interacted with the advertiser's website or the advertiser's targeted app (onsite activity database 310), each of these types of factors may positively or negatively impact the valuation of the global budget. In addition, the global budget logic 360 may consider the same types of factors considered by the channel-specific logics 342-348 (e.g., frequency or amount of purchases, customer demographic information, time or activity on the advertiser's website or in their app) at a macro level, considering information from all channels.

In one embodiment, if the customer makes a purchase in response to the marketing event, the system may determine that the customer is unlikely to make another purchase in the near future, and the global budget and/or one or more channel-specific budget values may be set to a value of zero (or almost zero). In a preferred embodiment, all of the channel-specific budget values $Y_i$ would drop to zero after a purchase is made, regardless of which marketing event motivated the purchase. Additionally or alternatively, if the customer has recently interacted with the website, the weight of the associated factor in Equation (2) may be increased, so as to ultimately decrease the global budget. This may be the case, for example, if the customer has a history of infrequent or spaced-apart purchases, or if the advertiser's product or service is one that would be infrequently needed. In industries where the advertiser's product may be purchased frequently or indefinitely, the weighting may be smaller in value, so as to less strongly reduce the global budget. In circumstances where the customer does not act in response to advertisements over a particular channel, or does not react positively to that channel, the channel-specific budget value for that channel may be reduced or set to zero. Additionally, in some embodiments, the global and channel-specific budgets may be reset after a certain period of time (e.g., a predetermined amount of time after a purchase is made) or until after a certain action is taken (e.g., the customer searches for the advertiser or uses their site to indicating a renewed interest).

It will be generally understood that the functions of the global budget logic are not limited to the actions described above, and other implementations are possible in other embodiments. In general, activities indicating that the customer is unlikely to purchase (or to purchase again) in the near future may be understood to be weighted by global budget logic 360 so as to strongly drag down the global budget value Z.

With reference once more to Equation (2), the value of each factor $b_m$ is multiplied by its respective weight, and the weighted value is subtracted from the calculated channel-specific budget value $Y_i$. The total subtracted weighted values will cumulatively be less than the channel-specific budget $Y_i$, therefore the equation $Y_i-w_1b_1-w_2b_2 \ldots w_mb_m$, for any value of i, will be a non-negative value, that is, either zero or a positive value. It will therefore be generally understood that the calculated global budget, taking into consideration the summation for all of the different channels 1 through I, will be higher than a channel-specific budget. This is to be expected because as the calculation involves the summation of multiple calculated channel-specific budget values $Y_i$. If the user can be reached via multiple marketing channels, the calculated ROI will be non-zero for each of those channels, and therefore the value $$\sum_{i=1}^{c} Y_i$$

will be greater than the respective $Y_i$ for any specific channel. The greater the number of channels through which the user can be reached, the greater the value of $$\sum_{i=1}^{c} Y_i.$$

The application of weights $w_1$ through $w_n$ to the overlap factors serves to contain this growing spend by constraining the budget based on an intelligent analysis of the particular relevant marketing channels. In some embodiments, the weights will be set such that the calculated global value Z is higher than any of the channel-specific budgets $Y_i$ but less than the sum of all of the values $Y_i$. However, in other embodiments, the global budget value Z may be larger than only a subset of the channel-specific budgets $Y_i$.

In one embodiment, global budget logic 360 may contain logic that applies machine learning techniques to identify, in real time, predictive values for the weights $w_1, w_2, \ldots, w_n$, based on, e.g., known or expected negative effects when a particular combination of channels are used, and/or historical patterns in customer activity (among all customers) that share commonalities with the factors relevant to a particular customer. The logic may then compute a predictive global budget value using the techniques described in the present disclosure with respect to Equation (2).

The channel-specific budget logics 342-348 and the global budget logic 360 are configured to operate together, the channel-specific logics generating data that feeds into the global logic to determine a total (or global) investment to be made for a user. Despite this, the channel-specific and global budgets are logically separated from each other. In some embodiments, the channel-specific and global budgets may be implemented through position independent code. In a case that one or more channel-specific logics does not function to calculate a channel-specific budget value, the global budget logic 360 may nonetheless function, calculating a global budget value while ignoring (or in some embodiments, setting to zero or some default value) the $Y_i$ for that channel. Because the channel-specific logics function discretely from each other and from the global calculation logics, the models used for calculation therein may evolve to more accurately identify relevant factors and/or weightings without changing the overall behavior of the system, and without the need to update the computer code and/or algorithms of any other logic of the system 200.

Because each calculated channel-specific budget value $Y_i$ already takes into consideration a customer's expected response to a marketing event over the channel, the global budget value may not increase dramatically for channels that have been determined as not (or less) effective in eliciting customer response. Further, the customer's actual historical actions and preferences are considered, such that a potential customer who, e.g., uses only email would be assigned a much lower global budget value than a potential customer who is heavily engaged in social media. In addition, the application of weighted factors deducts from the budget by recognizing effects of interaction between different marketing channels. By these means, a high number of channels through which a customer can be reached can negatively impact the global budget for marketing to that user, thereby constraining the number of channels and/or marketing events that are delivered to that user. Accordingly, unfavorable impressions and/or wasted efforts of marketing to one user of multiple channels can be mitigated.

Figure 4A:
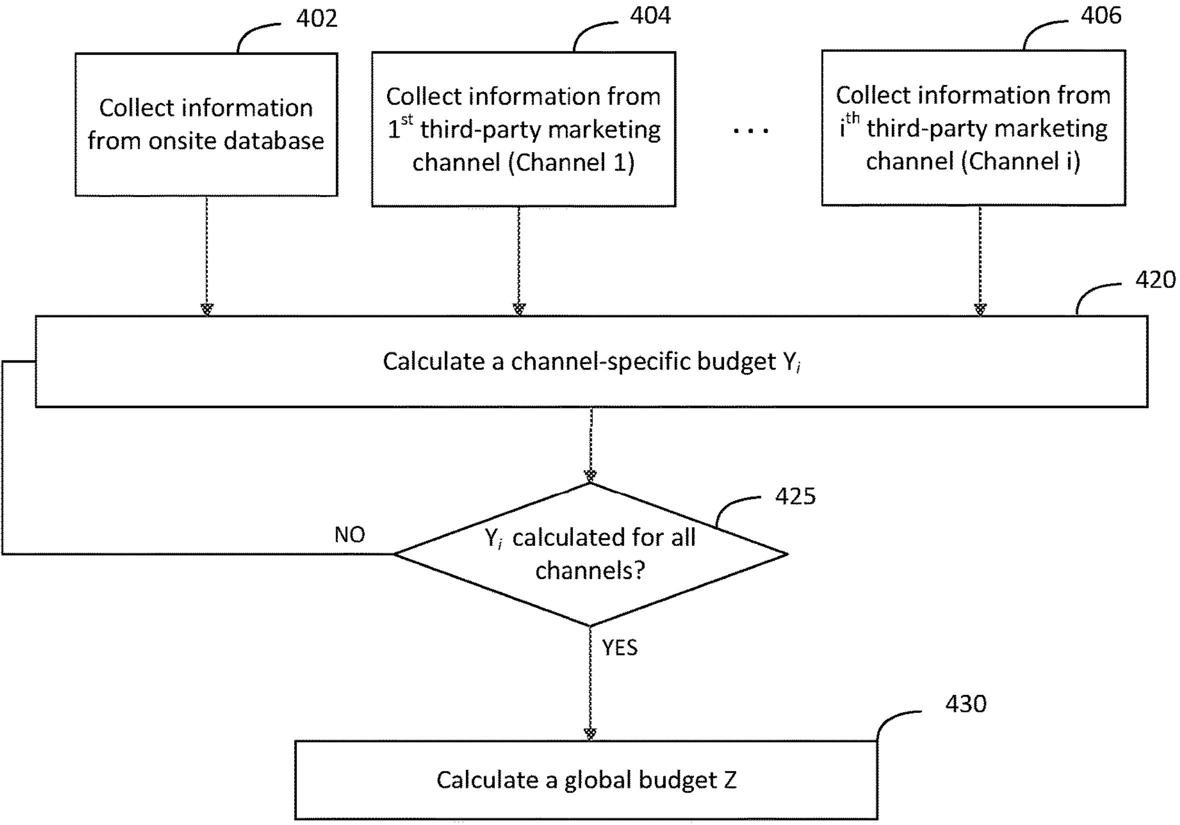
FIG. 4A is a flow chart illustrating an exemplary method of calculating a multi-channel budget for delivering marketing events to a customer.
Figure 4B:
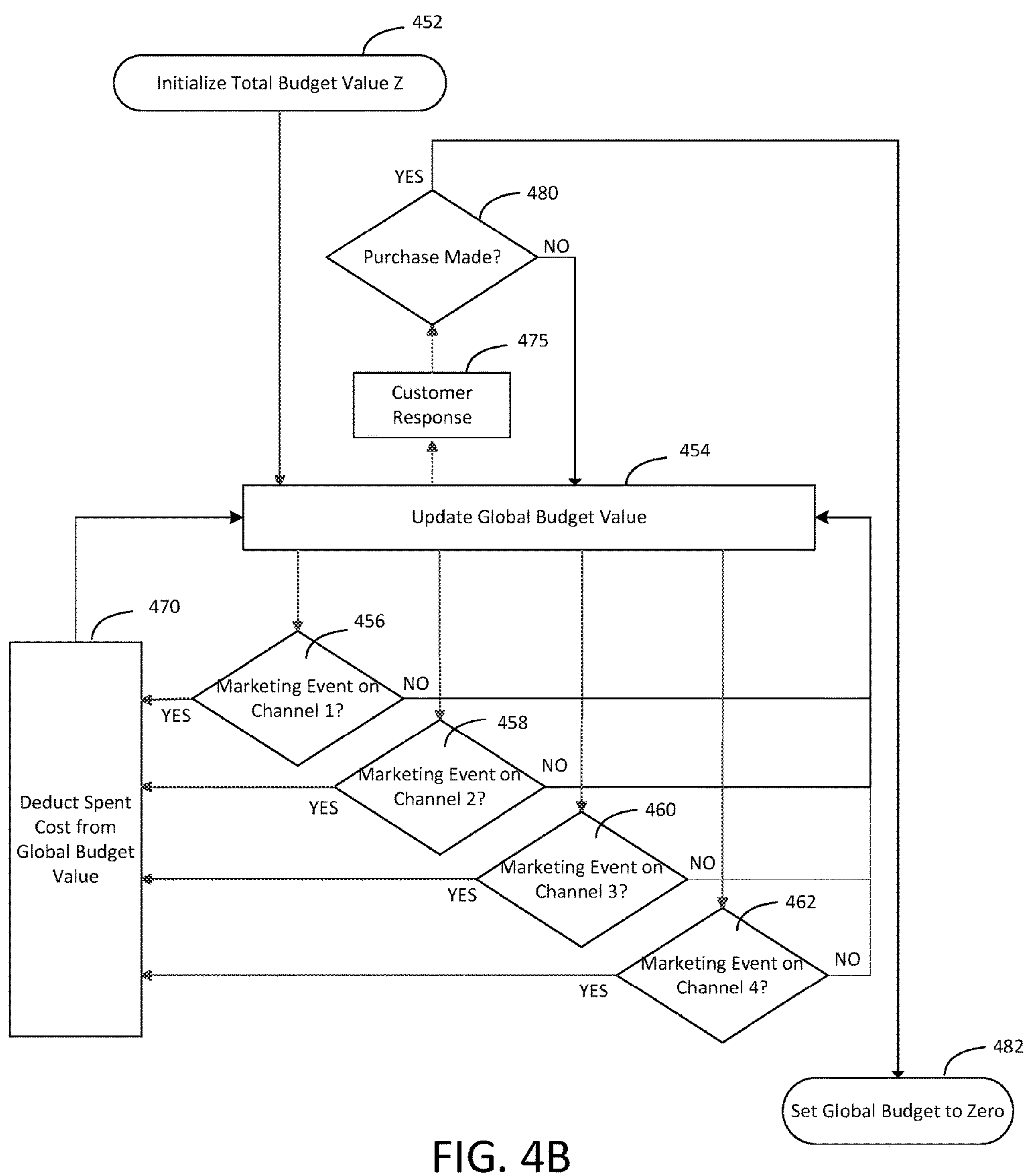
FIG. 4B is a flow chart illustrating an exemplary method of managing a global budget for delivering marketing events to a customer.

FIGS. 4A-4B illustrate an exemplary process that the system may follow to calculate and manage the global budget value. In one example implementation using the process described in FIGS. 4A-4B, the advertiser engaging in marketing efforts may be an e-commerce site that manages the lease or rental of properties, though of course other types of advertisers may be possible in different embodiments, as described above. The advertiser in this implementation presents, to a customer, a list of property listings available for lease or rental. The customer may sort, filter, or otherwise interact with or manipulate this list to display a set of property listings matching the customer's preferences. The customer may select a property listing to view additional information about, e.g., the type of property, information about the property, and its availability. The customer may book the property, paying money in exchange for a scheduled rental of the property at a certain range of day(s)/time(s). According to the exemplary implementation, the advertiser may deliver advertisements to the customer via a number of digital channels. The advertiser may deliver an advertisement for one or more property listings to the customer, or for the advertiser or its services generally, by sending a targeted email to the customer (a first channel), by displaying a text-based or graphical advertisement for the advertiser and/or property listings alongside the customer's search results when using a search engine (a second channel), by sending a text message to the customer with information about the advertiser and/or one or more property listings (a third channel), and by delivering an advertisement for the advertiser and/or one or more property listings to the customer while they are using or operating an app on their smartphone (a fourth channel), though of course other embodiments may use different types or numbers of channels. Each of the advertisements may provide, in some form, a hyperlink to the advertiser's website.

The advertiser may collect information about whether the customer responds to the advertisement through various sources. With regard to the first and third channels, the advertiser is the one directly delivering the communication to the user, and may format the content of the hyperlink to contain information through which the advertiser may track whether the customer clicked on the link in the email or message. This information may be accessed from an onsite database managed by the advertiser (Step 402), though other storage in other locations is possible in different embodiments. With regard to the second and fourth channels, the advertiser may obtain information from the third party source directly serving the advertisement to the user, e.g., the search engine provider or the third party application owner (Steps 404, 406). This information may include, for example, data about the user's interaction with the channel, such as how long they viewed an advertisement, the placement of the advertisement on their screen, whether and when they clicked on the ad, information about the user's device or location, etc., among other things.

The information collected by the advertiser, along with other information stored in the advertiser's onsite database, is used to calculate a channel-specific budget $Y_1$ for the first Channel 1 (Step 420). Step 420 may consider, from the advertiser's online database, information about the user's interaction with the advertiser's website (such as whether they performed a search of property listings, whether they filtered on such results, whether they made a booking, etc.), along with information about the user available to the advertiser in their database, such as, e.g., demographic information, booking history and frequency over the channel, among other things. This information is used to identify factors relevant to the return on investment expected over the channel, and each factor is considered, along with a weighted value for each. The sum of those weighted values and multiplied by a predetermined profit coefficient to get a channel-specific budget value $Y_1$.

As multiple channels (here, four) exist, a channel-specific budget must be calculated for each channel; that is, in the example described above, if the channel-specific value $Y_i$ has not been calculated for each of the i channels (Step 425), the process cycles back and calculates another channel-specific value (for Channel 2, Channel 3, and Channel 4). In FIG. 4A, the calculation of channel-specific budgets is done serially (cycling back repeatedly to Step 420), however, in alternate embodiments, two or more (or all) of the channel-specific budget logics may be processed in parallel. If a channel-specific budget $Y_i$ has been calculated for all channels, the process continues to Step 430, in which the global budget Z is calculated. The calculation of Z (430) uses a summation of the calculated channel-specific budgets for Channels 1-4, as well as information about the user available to the advertiser in their database, such as, e.g., demographic information, booking history and frequency over the channel, etc., among other things. The information in the onsite database is not tied solely to any one channel. This information, as well as the channel-specific information from the channel-specific logics and third party sources, is used to identify factors indicating the potential detrimental (overlap) effects of advertising over two or more of Channels 1-4 together. Each factor is considered along with a weighted value for each. These weighted values are subtracted from the summed total, and multiplied by a predetermined profit coefficient, to get a global budget value Z.

FIG. 4B illustrates a process of managing a calculated global budget Z (initialized in Step 452 from the calculation in Step 430 (FIG. 4A)). The global budget is updated in Step 454 (in a first instance, no update is made). The global budget may be altered in one of two ways: either a marketing event occurs over one of the channels or the customer takes an action, such as making a booking on the advertiser's website. In the first circumstance, a marketing event may occur on any of Channel 1 (Step 456), Channel 2 (Step 458), Channel 3 (Step 460), or Channel 4 (Step 462). The cost of delivering the marketing event may vary depending on the channel that was used. However, in any of the scenarios, if a marketing event is performed, the associated cost is deducted from the global budget (Step 470) and the global budget is re-calculated to obtain an updated global budget Z (Step 454). It may be understood that the calculation of the updated global budget need not be a mere subtraction but may involve the determination of one or more updated overlap factors and/or the application of updated weights or updated overlap factors to aid in the calculation. The process then waits again for a marketing event or action to be taken. As the global budget is reduced after each event, the method of FIG. 4B must be conscious of global budget, and it may be generally understood that no marketing event will occur on a channel if the cost of delivering that marketing event (varying per channel) exceeds the value of the updated global budget Z.

If a customer response is received in Step 475, whether or not it is in direct response to the marketing event (Steps 456-462), the system determines, with reference to Step 480, whether that response is a purchase made. If no purchase was made, the response may be either a different positive response (e.g., navigating to advertiser's website) or a negative response (e.g., hiding an advertisement). The global budget value may be updated (Step 454) in accordance with this response, i.e., increased or reduced if the response was positive, reduced if the response was negative, or remaining unchanged if the response was neutral or close to neutral. If the customer did make a purchase (or a purchase was made on the customer's behalf, e.g., through a third party such as a travel agent), the process continues to Step 482, in which the global budget Z is temporarily or permanently set to zero, or to a value close to zero. This reduction is done (Step 482) even where the purchase/booking was not necessarily motivated by a marketing communication over Channels 1 through 4. The global budget value may be recalculated (Step 454) or reset (Step 452) in a case that a predetermined or otherwise meaningful amount of time has passed since a booking was made, under a theory that a customer is unlikely to be motivated by an advertisement to make another booking soon after one was made.

In an alternate implementation, the systems and methods described herein are not limited to purely digital marketing channels, but instead may also encompass wholly or partially non-digital (e.g., analog or offline) mechanisms for marketing to customers. As one example embodiment, a customer may receive, via the postal service, newspaper, or through a promotional sign, flyer, or billboard, a marketing advertisement with a discount or promotional code (e.g., QR code) that can be scanned by a phone or redeemed in a store or on a website (whether owned/operated by the advertiser or a third party). This code is a traceable code that may be converted to digital information. When a purchase of the advertiser's product is made using the discount code, digital information collected from and in relation to the code may be sent to the advertiser and stored in the onsite activity database 310 or an alternate database (not specifically shown in FIGS. 4A-4B). The digital information may indicate, for example, a date and/or frequency at which the paper-based or non-digital advertisement was delivered to the customer (if scanned) or redeemed, data about the customer, and the elapsed time from delivery until the purchase was made. As another example, a promotional sign, flyer, or billboard or other non-digital marketing media can be displayed to the customer, and the customer may manually enter traceable digital information into their phone or computer associating their purchase with the displayed marketing media. In either scenario, although the marketing event was delivered via a non-digital marketing channel, the information conveyed therein, as well as the customer's responsive interactions with the advertiser's website, is presented to the channel-specific and global logics 342-348 and 360 as digital information. The digital information may be considered by the respective logics in a manner similar to that described in the systems and methods described herein. Similarly, other non-digital marketing channels may be used in different embodiments.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system for selecting a digital channel for delivery of content to a user, the system comprising:

a memory configured to store data relating to a user's activity on a first channel and a second channel;

a processor coupled to the memory, the processor being configured to:

(a) collect a first plurality of user metrics relating to the user's activity on the first channel and a second plurality of user metrics relating to the user's activity on the second channel;

(b) generate, based on the first plurality of user metrics, a first channel cost value;

(c) generate, based on the second plurality of user metrics, a second channel cost value;

(d) determine, based on the first plurality of user metrics and the second plurality of user metrics, a channel overlap value representative of an effect of content on both of the first channel and the second channel;

(e) calculate, in real-time:

(1) using a trained machine learning model, an overlap weight for the channel overlap value, wherein the trained machine learning model is trained to identify user intent based on data relating to user activity on the first channel and the second channel; and (2) a multi-channel cost value, the multi-channel cost value being a user-specific cost for delivering content to the user across the first channel and the second channel, wherein the multi-channel cost value is a function of the first channel cost value, the second channel cost value, and the channel overlap value weighted by the overlap weight; and (f) select, based on the calculated multi-channel cost value, a channel from among the first channel and the second channel, for delivery of content.

2. The system according to claim 1, wherein the processor is further configured to:

determine that the multi-channel cost value is higher than a cost of delivering content to the user over the first channel;

deliver content to the user over the first channel; and re-calculate the multi-channel cost based on the cost of delivering the content to the user over the first channel.

3. The system according to claim 2, wherein the processor is further configured to:

determine whether the user has taken an action in response to the delivery of the content; and if the user has taken an action in response to the delivery of the content, set the multi-channel cost value to zero.

4. The system according to claim 1, wherein the channel overlap value is associated with a number of times content is delivered to the user over the first channel and a number of times content is delivered to the user over the second channel.

5. The system according to claim 1, wherein the channel overlap value is associated with a number of times content is delivered to the user over the first channel or the second channel within a predetermined period of time.

6. A system for selecting a channel for delivery of content to a user, the system comprising:

at least one processor; and a memory storing (i) data relating to a user and (ii) a set of instructions, which, when executed by the at least one processor, cause the system to:

(a) obtain, from a first remote server, a first plurality of user metrics relating to activity of the user on a first channel of a plurality of channels;

(b) obtain, from a second remote server, a second plurality of user metrics relating to activity of the user on a second channel of the plurality of channels;

(c) obtain, from the memory, the data relating to the user;

(d) generate, based on the first plurality of user metrics and the data relating to the user, a first channel cost value;

(e) generate, based on the second plurality of user metrics and the data relating to the user, a second channel cost value;

(f) identify, based on the first plurality of user metrics and the second plurality of user metrics, one or more adverse condition values;

(g) calculate, in real-time:

(1) using a trained machine learning model, for each of the one or more adverse condition values, a respective adverse condition weight, wherein the trained machine learning model is trained to identify user intent based on the data relating to the user; and (2) a global cost value associated with the user, wherein the global cost value is a function of the first channel cost value, the second channel cost value, and the one or more adverse condition values each weighted by its respective adverse condition weight;

(h) deliver a content to the user via the first channel based on the calculated global cost value;

(i) obtain, from the first remote server, updated user metrics relating to the activity of the user on the first channel; and (j) re-calculate the global cost value based on the updated user metrics.

7. The system according to claim 6, wherein the updated user metrics indicate that the user has made a purchase in response to the content delivered to the user via the first channel, and wherein, in the re-calculating, the global cost value is set to zero.

8. The system according to claim 7, wherein the instructions, when executed, further cause the system to:

re-calculate the global cost value associated with the user based on (a) whether a predetermined amount of time has passed after the global cost value is set to zero or (b) whether a predetermined action has been taken by the user after the global cost value is set to zero.

9. The system according to claim 6, wherein the updated user metrics indicate that the user has taken no action in response to the content delivered to the user via the first channel, and wherein, in the re-calculating, the global cost value is reduced.

10. The system according to claim 6, wherein the updated user metrics indicate that the user has clicked on a hyperlink provided in the content delivered to the user via the first channel, and wherein, in the re-calculating, the global cost value is reduced.

11. The system according to claim 6, wherein a first adverse condition value of the one or more adverse condition values indicates whether a content has been delivered to the user over both the first channel and the second channel.

12. The system according to claim 6, wherein the data relating to the user indicates demographic information of the user.

13. A method performed by a computer system connected, via a network, to a plurality of remote servers corresponding respectively to a plurality of channels, the method comprising:

(a) obtaining, from each of the remote servers, a respective plurality of user metrics relating to delivery of content to a user over a channel of the plurality of channels, wherein a first plurality of user metrics associated with a first of the plurality of channels and a second plurality of user metrics associated with a second of the plurality of channels are obtained;

(b) obtaining, from a memory of the computer system, (i) a third plurality of user metrics relating to the delivery of content over a third channel, and (ii) user information;

(c) generating, for each of the plurality of channels, a respective channel cost value, wherein a first channel cost value is generated based on the first plurality of user metrics and user information, a second channel cost value is generated based on the second plurality of user metrics and the user information, and a third channel cost value is generated based on the third plurality of user metrics and the user information;

(d) calculating, in real-time, a multi-channel cost value, wherein the calculating of the multi-channel cost value comprises:

(1) calculating, using a trained machine learning model, a first weight of a first adverse effect based on the first plurality of user metrics and the second plurality of user metrics and a second weight of a second adverse effect based on the first plurality of user metrics and the third plurality of user metrics, wherein the trained machine learning model is trained to identify user intent based on the user information; and (2) calculating a multi-channel cost value as a function of the first adverse effect weighted by the first weight, the second adverse effect weighted by the second weight, and the respective channel cost value for each channel of the plurality of channels; and (e) delivering a content to the user based on the multi-channel cost.

14. The method according to claim 13, wherein the first adverse effect is associated with a number of times content is delivered to the user over the first channel and a number of times content is delivered to the user over the second channel.

15. The method according to claim 13, wherein the user information is historical information about activity of the user in response to receiving content.

* * * * *